US011042930B1

(12) United States Patent
Mintz et al.

(10) Patent No.: US 11,042,930 B1
(45) Date of Patent: Jun. 22, 2021

(54) INSUFFICIENT FUNDS PREDICTOR

(71) Applicant: INTUIT INC., Mountain View, CA (US)

(72) Inventors: Ido Mintz, Tel Aviv (IL); Liron Hayman, Hod HaSharon (IL); Elhanan Mishraky, Nofim (IL)

(73) Assignee: INTUIT, INC., Mountain View, CA (US)

( * ) Notice: Subject to any disclaimer, the term of this patent is extended or adjusted under 35 U.S.C. 154(b) by 257 days.

(21) Appl. No.: 15/925,817

(22) Filed: Mar. 20, 2018

(51) Int. Cl.
*G06Q 40/02* (2012.01)
*G06N 7/00* (2006.01)

(52) U.S. Cl.
CPC ............ *G06Q 40/02* (2013.01); *G06N 7/005* (2013.01)

(58) Field of Classification Search
CPC ..................................................... G06Q 40/02
See application file for complete search history.

(56) References Cited

U.S. PATENT DOCUMENTS

| 5,970,482 | A * | 10/1999 | Pham | G06N 3/0427 |
| | | | | 706/16 |
| 2007/0106558 | A1* | 5/2007 | Mitchell | G06Q 20/209 |
| | | | | 705/16 |
| 2009/0099959 | A1* | 4/2009 | Liao | G06Q 40/00 |
| | | | | 705/38 |
| 2013/0060669 | A1* | 3/2013 | Rose | G06Q 40/00 |
| | | | | 705/35 |
| 2015/0310545 | A1* | 10/2015 | deOliveira | G06Q 40/02 |
| | | | | 705/35 |
| 2017/0323345 | A1* | 11/2017 | Flowers | G06Q 10/063112 |
| 2018/0060843 | A1* | 3/2018 | Maheshwari | G06Q 20/3224 |
| 2019/0095992 | A1* | 3/2019 | Soh | G07F 19/20 |
| 2019/0259095 | A1* | 8/2019 | Templeton | G06N 3/0445 |

FOREIGN PATENT DOCUMENTS

WO WO-2008060341 A2 * 5/2008 ............. G06Q 20/40

OTHER PUBLICATIONS

"Mary Wisniewski, Predicting low balances will stop overdraft fees, this startup says, Apr. 25, 2017, American Bankerm whole document" (Year: 2017).*
Dave; https://dave.com/about.
Change; https://gochange.co/about/.

* cited by examiner

*Primary Examiner* — Hani M Kazimi
*Assistant Examiner* — Adam Hilmantel
(74) *Attorney, Agent, or Firm* — Patterson & Sheridan, LLP

(57) ABSTRACT

Certain aspects of the present disclosure provide techniques for improving a prediction of whether a non-sufficient funds fee will be incurred by a user utilizing machine learning techniques. For example, a predictive model may be trained using machine learning techniques based on historical data and derived data for a plurality of users. The predictive model may then be used to predict a probability of a particular user incurring an insufficient funds fee. The probability of the particular user may be used to generate an alert and suggestion to be presented to the particular user to avoid incurring the insufficient funds fee.

20 Claims, 5 Drawing Sheets

INSUFFICIENT FUNDS PREDICTOR

INTRODUCTION

Aspects of the present disclosure relate to predicting whether a user will incur an insufficient funds fee within a number of days.

Each year, consumers pay millions of dollars in fees to banks for insufficient funds (alternatively, "non-sufficient funds") in a financial account. For example, a consumer may overdraft an account if the consumer writes a check on a checking account for an amount that is more than the balance of the account. In that case, the check written by the consumer causes the balance of the checking account to be negative. Many banks today allow a consumer to overdraft from their account up to an agreed amount. However, if the consumer does overdraft their account, the bank typically charges a fee of $30-$35 to the consumer for having insufficient funds in their account.

Existing approaches to help a consumer avoid paying fees for insufficient funds or an overdraft include monitoring recent activity in a single account of the consumer and alerting the user when the balance is predicted to fall below some threshold. However, many shortcomings exist with this approach. For example, some consumers may routinely maintain a low balance in their checking account and yet never have an insufficient funds event. As such, if the balance of the checking account is used as the primary predictor of the likelihood of incurring an insufficient funds fee, the predictive model may incorrectly predict insufficient funds events regularly. Thus, account balances alone are not a good predictor of whether the consumer will incur an insufficient funds fee. Accordingly, an improved technique for predicting whether a user will incur an insufficient funds fee is needed.

BRIEF SUMMARY

Certain embodiments provide a system comprising a processor and a memory comprising executable instructions, which, when executed by the processor, cause the system to perform an operation. The operation generally includes obtaining historical data related to a financial history of each of a plurality of users. The operation further includes deriving one or more historical data variables from the historical data. The operation further includes generating one or more derived variables from the historical data. The operation further includes forming a plurality of data subsets from the historical data based on the one or more historical data variables and the one or more derived variables, each data subset of the plurality of data subsets comprising a different set of data than any other data subset in the plurality of data subsets. The operation further includes training a boosted decision tree model based on the plurality of data subsets. The operation further includes obtaining new financial data related to a user. The operation further includes predicting a probability of the user incurring an insufficient funds fee during a prediction period with the boosted decision tree model.

Other embodiments provide a non-transitory computer-readable storage medium storing instructions, which, when executed on a processor, performs an operation for an insufficient funds fee. The operation generally includes obtaining historical data related to a financial history of each of a plurality of users. The operation further includes deriving one or more historical data variables from the historical data. The operation further includes generating one or more derived variables from the historical data. The operation further includes forming a plurality of data subsets from the historical data based on the one or more historical data variables and the one or more derived variables, each data subset of the plurality of data subsets comprising a different set of data than any other data subset in the plurality of data subsets. The operation further includes training a boosted decision tree model based on the plurality of data subsets. The operation further includes obtaining new financial data related to a user. The operation further includes predicting a probability of the user incurring an insufficient funds fee during a prediction period with the boosted decision tree model.

Other embodiments provide a method for predicting an insufficient funds fee. The method generally includes obtaining historical data related to a financial history of each of a plurality of users. The method further includes deriving one or more historical data variables from the historical data. The method further includes generating one or more derived variables from the historical data. The method further includes forming a plurality of data subsets from the historical data based on the one or more historical data variables and the one or more derived variables, each data subset of the plurality of data subsets comprising a different set of data than any other data subset in the plurality of data subsets. The method further includes training a boosted decision tree model based on the plurality of data subsets. The method further includes obtaining new financial data related to a user. The method further includes predicting a probability of the user incurring an insufficient funds fee during a prediction period with the boosted decision tree model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
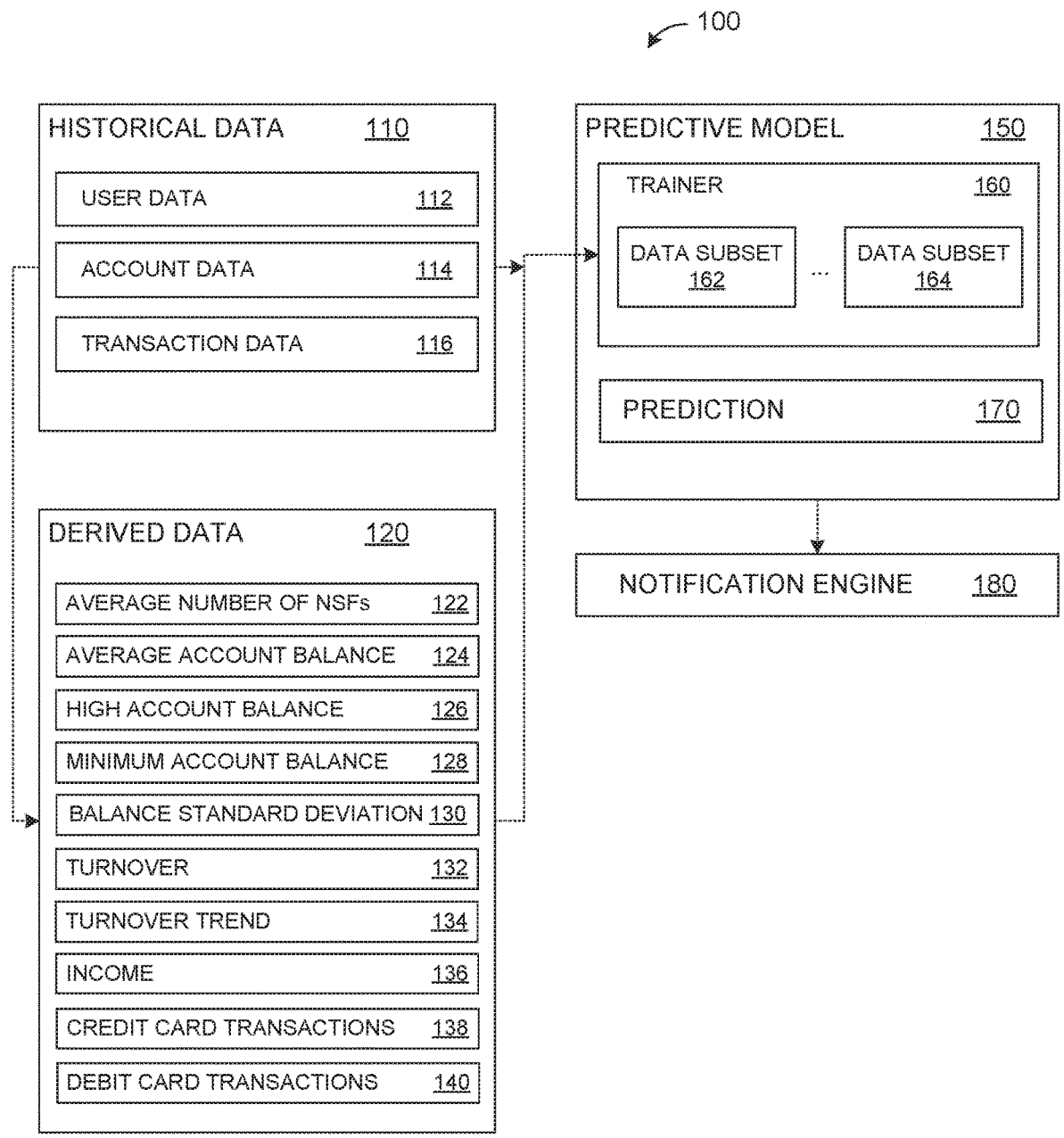
FIG. 1 depicts an example system for training a predictive model to predict insufficient funds fees using machine learning.

Aspects of the present disclosure provide apparatuses, methods, processing systems, and computer readable storage mediums for predicting whether a customer will incur an insufficient funds fee within a period of time. In some embodiments, machine-learning techniques may train predictive models that more accurately predict whether a user will incur an insufficient funds fee.

Many financial institutions require a customer to pay a fee when the customer does not have sufficient funds in their banking account to cover a transaction. For example, users of MINT®, a web-based personal financial management service available from Intuit, Inc. of Mountain View, Calif., pay over $250 million annually in fees to five of the largest banks (e.g., JPMorgan Chase, Wells Fargo, etc.) due to overdrafts or insufficient funds in an account. In many cases, the transactions that result in the insufficient funds fees involve less than $50. Moreover, in most cases, the user incurring the insufficient funds has sufficient funds in their collective accounts, just not in the particular account for which the user incurred the insufficient funds fee. For example, a user may have multiple checking accounts, or a savings account and a checking account that are not linked, etc. To help users avoid paying insufficient funds fees, a predictive model may be used to generate a prediction about the likelihood of the user incurring an insufficient funds fee over a period of time. The prediction may further be used to prompt notifications to the user, which may include suggestions to the user on how to avoid the insufficient funds fee (e.g., suggesting to the user to move money from one account into another account in advance of any insufficient funds event).

In some embodiments, a decision tree learning technique may be utilized to produce a decision tree-based model, which may predict the likelihood of a user incurring an insufficient funds fee. The decision tree-based model may use regression trees where the target variable can take continuous values (typically real numbers). For example, the target variable may be a probability of an insufficient funds fee during a period of time.

Algorithms for constructing decision trees usually work top-down, by choosing a variable at each node or step that best splits the set of items or observations. Different algorithms use different metrics for measuring the best split, but these algorithms generally measure the homogeneity of the target value within the subset of observations. The metrics are applied to each candidate subset and the resulting values are combined (e.g., averaged) to provide a measure of the quality of the split. For example, an algorithm to make a locally optimal decision at each node or step with the goal of finding a global optimum (e.g., a greedy algorithm) is a common strategy for learning decision trees from training data (e.g., historical data).

Using decision tress and regression techniques to train a model is a type of supervised learning used for machine-learning techniques. Supervised learning may be used to infer a function from labeled training data consisting of a set of training examples. In supervised learning, each example is a pair consisting of an input object (typically a vector) and a desired output value (also called the supervisory signal).

The training data used for the decision tree-based model may include historical financial data for a plurality of users, which may include indications (e.g., a label) of whether each user incurred at least one insufficient funds fee during a time interval, such as in the current week or in a preceding week, etc. However, a complication with analyzing historical financial data from disparate financial organizations is that the different organizations may indicate insufficient funds events in different ways. For example, one financial organization may indicate an insufficient funds fee with a financial transaction description of "insufficient funds" while another financial institution may use "non-sufficient funds fee." Still another financial institution may indicate an insufficient funds fee using "overdraft fee." Thus, a first step in preparing training data for the predictive model may be to apply natural language processing to historical data to determine when the insufficient funds events occur. The outcome of such natural language processing may be a set of training data where an insufficient funds event or fee variable is determined for each financial institution of the user. Thus, the outcome of the natural language processing may identify one or more insufficient funds event or fee variables regardless of how the user's financial organization indicates the insufficient funds event in the historical financial data.

In some cases, the training data (e.g., historical financial data) may be limited to data related to users who have incurred at least one insufficient funds fee during a backward-looking time interval (e.g., a preceding six months). For example, the training data may be limited to financial data of users who have incurred an insufficient funds fee during the previous six months. Insufficient funds events may be rare when considering a large amount of historical financial data (e.g., a large number of transactions) conducted by each user. Thus, limiting the time period of the training data may increase an accuracy of the prediction of whether the user will incur an insufficient funds fee during a time period.

The data used to train (i.e., "learn") a decision tree may be formatted in a particular way. Formatting the data in a particular way may ease implementation of a particular training algorithm. For example, the data may be formatted into vectors, such as $(x,Y)=(x_1, x_2, x_3, \ldots, x_k, Y)$, where the dependent variable, Y, is the target variable that corresponds to the input variables $x_1, x_2, x_3, \ldots, x_k$.

The training data for a given user may include many distinct types of data that can form the basis of input variables for a decision tree model. For example, some input variables may be categorical (e.g., marital status) while other input variables are numerical (e.g., credit score and transactional data). Further, some input variables may be explicit (e.g., a particular transaction) while some may be derived (e.g., an average account balance, a high balance over a period of time, etc.). In some cases, input variables may be transformed prior to being used to train a model. For example, an input variable may be mapped to specific values based on a function, normalized, etc. In one specific example, an input variable may be transformed by finding a natural logarithm of that variable. In that case, to prevent an error from occurring for a variable that is near zero or a negative number, it may be assumed that:

$\ln(x)=-\ln(-x)$, for $x<-1$ $\ln(x)=0$, for $-1 \leq x \leq 1$.

In some embodiments, the training data may include user related data, historical financial data, and derived data. For example, the user related data may include a credit score of a user, a marital status of the user, a zip code of the user, a number of accounts of the user, types of accounts of the user (e.g., savings, checking, investments, loans, credit cards, etc.), an indication of whether the user is a social security recipient, and the like. The user related data may also include a number of times the user logged into a related financial application during a backward-looking period. The user related data may also include frequency of purchases from a particular merchant or a particular type of transaction.

In some embodiments, the historical financial data may include account data (e.g., data related to one or more accounts of the user) and transaction data (e.g., data related to transactions conducted by the user during a backward-looking period). The account data may include an identification of each account of the user (e.g., an account number), a balance of funds in each account of the user at a particular time, a last balance of the account, a financial institution where the account is located, etc. The transaction data may include data related to transactions where funds are deducted from the account (e.g., purchase of a good or service, etc.) as well as transactions where funds are added to the account (e.g., paycheck, social security payment, etc.). Data related to a particular transaction may also include a date, an amount, a merchant related to the particular transaction, an indication of a type of the transaction (e.g., a debit from or a credit to the account), etc.

In some embodiments, the derived data may be determined from or engineered from the historical financial data. For example, the derived data may include an average account balance for a period of time, a maximum account balance over a period of time, etc. The derived data may indicate a financial behavior of the user. For example, the derived data may indicate a number of transactions conducted by the user with a debit card and a number of transactions conducted by the user with a credit card. The derived data may also indicate a type of transaction typically conducted by the user with a debit card or credit card (e.g., the user typically purchases groceries with a debit card and typically purchases gas with a credit card).

The derived data may also include, for example: an average number of insufficient funds fees incurred by a user, a minimum account balance and a maximum account balance, a maximum minimum balance (e.g., a highest minimum balance), a standard deviation of the account balance, a total amount of debits from the account (e.g., a total amount spent by the user), an income trend (e.g., a sum of credits to the account divided by a minimum sum of credits to the account for each of the preceding four weeks), a sum of all debits from and credits to the account (e.g., turnover), a turnover trend (e.g., a turnover during the preceding week divided by a maximum (or minimum) turnover during each of the preceding four weeks), a percentage of transactions conducted using a credit card, a percentage of transactions conducted using a debit card, a sum of the credits to the account of the user (e.g., income), a number of credit card transactions with a value less than a specific number (e.g., less than $200), a number of debit card transactions with a value of less than a specific number (e.g., less than $50), a debit trend (e.g., a sum of all debit card transactions during a preceding week divided by a minimum sum of debit card transactions to the account for each of the preceding four weeks), a percentage of debit card transactions that post to the account of the user (e.g., indicating sufficient funds in the account for those transactions), and others.

For each derived variable which involves a trend (e.g., an income trend, a turnover trend, a debit trend, etc.), if the divisor of the trend (e.g., the maximum (or minimum) value over a preceding backward-looking period) is zero, then the trend may be determined by dividing the dividend of the trend by one. This prevents an error from occurring when determining a trend with a minimum value of zero.

In some examples, the training data may be determined at a transactional level. For example, the standard deviation of the account balance may be determined using a balance in the account following each transaction conducted by the user. Thus, the standard deviation of the account balance may be determined using a balance in the account following each transaction conducted by the user. In some examples, the training data may be determined at a daily or weekly level.

Each item of the training data may be determined over a specific period of time. For example, the minimum account balance may be determined for a current week, a preceding week, or each of a preceding four weeks. Similarly, a number of credit card transactions with a value less than a specific number may be determined for a current year, a preceding year, or each of a preceding four years. These are merely some examples.

The training data may be used to group similarly situated users. For example, categorical variables, such as marital status, may be used to group users. In some examples, continuous variables (e.g., an average number of insufficient funds fees for a user during a backward-looking period), whether historical financial data or derived data, may be transformed into discrete categories that can be used to group users. Each group of users may include users that are more similar to other users in that category than users in other categories.

For example, users may be grouped based on a number of insufficient funds fees incurred over a given period of time, a number of insufficient funds fees incurred over a given period of time within a range (e.g., between five and ten), an account balance prior to incurring an insufficient funds fee (e.g., a high account balance over $10,000, a medium account balance between $10,000 and $5,000, or a small account balance less than $5,000), a frequency of incurred insufficient funds fees (e.g., weekly, monthly, bi-monthly, etc.), an activity level in a financial management application (e.g., a number of times a given user logged into the application over a given time period), a merchant related to a particular number of transactions (e.g., a merchant from which the user purchased goods at least five times over a given period of time), and whether the user receives social security payments. These factors are merely examples and many others are possible, including a combination of the preceding factors. In some cases, a different predictive model may be created and trained for each group of users. A smaller data set, corresponding to a particular group of users, may increase the speed of training a predictive model.

The age of the training data (i.e., a backward-looking period) may be adjusted based on a forward-looking prediction period. For example, if the prediction period is one week, the predictive model may be trained based on data that is no older than three months if it is determined that data older than three months does not add to the predictive capability of the model for the forward-looking prediction period. Thus, "aged" user data may be purposefully filtered in order to improve the performance of the predictive model in some cases. In this way, the predictive model may account for changing user behaviors over time. Notably, the example of three months of backward-looking training data for a one week prediction period is merely one example, and others are possible. An appropriate period for backward-looking training data and a forward-looking prediction period may be tuned based on the performance of the resulting predictive model.

Recurring transactions may be identified from the historical financial data of the user. A recurring transaction may be used by the predictive model to determine an amount of funds that will be deducted from the balance of the account during a forward-looking period (e.g., a prediction period) and thus may increase the ability of the predictive model to predict insufficient funds events. For example, if a recurring bill payment happens on a particular day of the month, which falls within the prediction period, and the current balance of the payment account is insufficient to cover that recurring bill payment, an insufficient funds event may be predicted for the prediction period. In some cases, an amount of a particular recurring transaction may not be consistent for each occurrence of the recurring transaction. For example, a particular recurring transaction may be a payment for dry cleaning services, which varies in amount from week to week, even if the payment generally occurs on the same day every week. In such a case, the predictive model may determine a variable (e.g., an average or median) for a number of preceding transactions related to dry cleaning services and use that variable for the forward-looking prediction period. In some cases, the number of preceding transactions used to calculate the variable may be determined based on a length of the forward-looking prediction period. In some cases, an amount and frequency of a recurring transaction may be predicted by a different predictive model. For example, the different predictive model may be trained to identify one or more recurring transactions based on the historical financial data.

The training data used to train a decision tree model may be separated by week. For example, historical financial data related to a particular user may be separated by week. In some cases, data related to a particular week may be averaged or otherwise summarized for that week. In other cases, the data for a given week may comprise a block of data points for the given week. Data related to a particular week may include a balance for each account of the user during that week, transactions conducted by the user during that week, etc. The data for the particular week may also include derived data (e.g., a percentage of transactions conducted with a credit card) and an indication of whether the user incurred an insufficient funds fee during that week. For example, data related to a first week of the preceding year may be separated from data related to a second week of the preceding year, which is separated from data related to a third week, and so on.

A decision tree-based model (or any other supervised model) may be trained to predict a likelihood of whether a user will incur an insufficient funds fee. Decision trees may be well suited for such predictions because they handle mixed variable types well (e.g., categorical and numerical), they require little data preparation (e.g., no need to create dummy variables to shift the outcome), and they perform well with large data sets.

If the decision tree model determines that a user is likely to incur an insufficient funds fee, a notification may be generated to alert the user about the predicted insufficient funds fee, and the notification may provide a recommended action the user can take to avoid the insufficient funds fee. For example, if the predictive model determines that an insufficient funds event will likely occur in a checking account of the user, an alert may suggest that the user transfer funds from a savings account into the checking account to avoid an insufficient funds fee. In another example, the alert may suggest that the user pay a particular bill with a credit card rather than writing a check associated with the checking account.

The notification may be presented to the user in many formats and on many devices. For example, the notification may be an SMS message that a user can view on a smartphone or tablet. In other examples, the notification may be an email message or a push notification sent to the user. The notification may be configured to be viewed on one or more types of electronic devices, such as a desktop computer, mobile device, tablet, etc.

The predictive system and techniques discussed herein improve the existing state of the art by providing a more accurate prediction of whether a user will incur an insufficient funds fee regardless of a type of account(s) that the user has and regardless of a financial position of the user. A more accurate prediction of potential insufficient funds fees may save consumers significant costs from avoided fees. Further, the predictive system and techniques provide an improved user experience by generating personalized suggestions on how to avoid an insufficient funds fee. That is, the system and techniques herein provide an ideal action for a given user to avoid an insufficient funds fee. Further, the system and techniques herein may help to make users more aware of their financial position and make better financial decisions.

Example System for Predicting an Insufficient Funds Fees Using Decision Trees

FIG. 1 depicts an example system 100 for predicting whether a user will incur an insufficient funds fee using machine learning.

System 100 includes a historical data repository 110, such as a database of historical data. Historical data repository 110 includes several types of data related to each of a plurality of users, such as historical financial data including user data 112, account data 114, and transaction data 116. Notably, these data may have characteristics as discussed above. These data can take various forms, such as numerical (e.g., an amount of a transaction), categorical (e.g., marital status of the user), etc. In some embodiments, the data may be modified from their original form, such as by normalization, filtering, or other transformations. Such transformations may be desirable to prepare the historical data 110 for usage in a predictive model, such as for training or testing the predictive model 150. The data types depicted in FIG. 1 are merely examples and many others are possible.

In some examples, historical data 110 may be gathered by an organization internally and stored in an electronic system of that organization. In other examples, some or all of the historical data 110 may be received from one or more third parties, such as a financial institution or a finance monitoring company. For example, the historical data 110 from one or more third parties may be aggregated by a financial management software. In some instances, data related to an account of a given user may be obtained from various financial institutions where the user maintains one or more financial accounts, such as a checking account, a savings account, an investment account, or a loan. The data related to each account may be aggregated by the financial management software into the account data 114.

System 100 also includes derived data 120, which are data derived from the historical data 110. Examples of derived data include: an average number of insufficient funds fees (NSFs) 122, an average account balance 124, a high account balance 126, a minimum account balance 128, a balance standard deviation 130, a turnover 132, a turnover trend 134, income 136, credit card transactions 138, and debit card transactions 140. These data may have characteristics as described above. These data may also take may also take various forms, such as numerical or categorical, as with historical data 110.

As depicted by the arrow between historical data 110 and derived data 120, the derived data 120 may be derived from or engineered from the historical data 110. For example, an average account balance 124 may be based on account data 114, and credit card transactions 138 may be based on transaction data 116. In other words, a data point, such as an average account balance for a particular week for a particular user may be derived from historical data 110. Many combinations of historical data may be used to form many derived data variables, such as average number of insufficient funds fees 122, turnover 132, and others.

All of the derived data 120 may be determined over a backward-looking period (e.g., a previous six months). The backward-looking period may be determined based on a forward-looking prediction period. As discussed above, the backward-looking period may be adjusted based on whether data older than the backward-looking period adds to the predictive capability of the model.

An average number of insufficient funds fees (NSFs) 122 for a particular user may be derived from account data 114 of that user and may indicate an average number of insufficient funds fees incurred by that user during a backward-looking period. The average number of insufficient funds fees 122 may include one or more of a weekly average, a monthly average, or an average over some other period of time.

The turnover 132 may be derived from transaction data 116 by determining a sum of all debits from and credits to a particular account. Again, the turnover may be determined over a particular backward-looking period. The turnover trend 134 may be determined by dividing a turnover for the backward-looking period by a maximum turnover over a longer backward-looking period. For example, the turnover trend may be the turnover of an account during a preceding three days divided by a turnover of the account during a preceding two weeks.

Income 136 may be determined from transaction data 116 as a sum of all credits to one or more accounts of a user. Income 136 may include paychecks received by a user, a refund for a transaction, social security payments, etc. Income 136 may be determined over one or more backward-looking periods. For example, income 136 for a user may be determined for all incoming transactions during a current week and a previous four weeks. Income 136 may also be a minimum income of a particular user per week during a preceding four weeks. In some cases, income 136 may be averaged where, for example, a user only receives a paycheck once per month, but the input variables to the model are based on weekly data.

Credit card transactions 138 may be derived from transaction data 116. Credit card transactions 138 may be a sum of all transactions conducted by a user with a credit card during the backward-looking period. Credit card transactions 138 may also be a number of transactions conducted during the backward-looking period with a credit card with a value under a credit threshold (e.g., under $200).

Similarly, debit card transactions 140 may be derived from transaction data 116. Debit card transactions 140 may be a sum of all transactions conducted by a user with a debit card during the backward-looking period. Debit card transactions 140 may also be a number of transactions conducted during the backward-looking period with a debit card with a value under a debit threshold (e.g., under $50).

Derived data 120 may also include a credit transaction rate (not shown). The credit transaction rate may be derived from transaction data 116 and may indicate a percentage of transactions during the backward-looking period that were conducted with a credit card. Similarly, derived data 120 may include a debit transaction rate (not shown) derived from transaction data 116. The debit transaction rate may indicate a percentage of transactions conducted during the backward-looking period with a debit card.

The derived data discussed above are merely examples. Many other variables can be derived from account data 114 and transaction data 116.

System 100 also includes a predictive model 150. Predictive model 150 may include trainer 160, which trains or "learns" predictive model 150. For example, trainer 160 may receive both historical data 110 and derived data 120 as training data, which may be divided into sample data subsets, such as data subsets 162 and 164. Each data subset may include historical data 110 as well as derived data 120. While only two data subsets (162 and 164) are depicted, trainer 160 may use any number of data subsets. For example, each sample data subset may correspond to a group of similar users based on historical data 110 or derived data 120. In some cases, each user in the plurality of users may be associated with only one group. In other cases, users may fall into more than one group. In either case, a predictive model may be trained based on the groups of users.

In some examples, all of the data subsets (e.g., data subset 162 through data subset 164) may represent only a portion of the total amount of historical data 110 and derived data 120. In this way, other historical data 110 and derived data 120 may be used as testing data to test the accuracy of predictive model 150.

The trainer 160 may adjust a length of the backward-looking period based on the prediction period to filter the training data used to train the predictive model 150. For example, the trainer 160 may train and test more than one predictive model for a given prediction period, each predictive model using a different backward-looking period. The trainer 160 may determine which of the predictive models is most accurate for the prediction period based on the testing data. The trainer 160 may then train the predictive model 150 using data subsets 162 and 164 including historical data 120 that occurred during the backward-looking period corresponding to the most accurate predictive model. Thus, the backward-looking period may be adjusted to tune the performance of the resulting predictive model 150.

The predictive model 150 may be, for example, a decision tree-based model. The predictive model 150 may be trained using data subsets (e.g., data subsets 162 and 164) comprising historical data 110 and derived data 120.

A gradient boosting technique may be used to increase an accuracy of the predictive model 150. Gradient boosting may be implemented, for example, using XGBoost, an open source software platform that provides a framework for gradient boosting. Gradient boosting involves combining many "weak" decision tree-based models to produce a more powerful and more accurate predictive model. A predictive model may be weak if it incorrectly predicts an outcome for particular training data. An additional "weak" predictive model may correct the deficiencies of a previous "weak" model, but may incorrectly predict an outcome for some other data. That is, a subsequent model may "learn" from errors of a previous model. For example, a first predictive model may incorrectly predict that a first user will incur an insufficient funds fee during a prediction period. A second predictive model may correctly predict that the first user will incur an insufficient funds fee during the prediction period, but may incorrectly predict that a second user will incur an insufficient funds fee during the prediction period. Thus, a third predictive model may be used to correctly predict that the second user will incur an insufficient funds fee during the prediction period. The first, second, and third predictive models may be combined to form a "boosted" decision tree model. That is, the boosted decision tree model may contain more than one decision tree for the training data. Each sequential iteration of adding a "weak" model to the boosted predictive model improves upon the performance of a previous model. Because the "boosted" model learns from the mistakes of previous models, the accuracy of the boosted model is increased over conventional predictive models using a single iteration.

The data input into to the trainer 160 may be formatted in a particular way, such as a vector format like $(x,Y)=(X_1, x_2, x_3, \ldots, x_k, Y)$, where the dependent variable, Y, is the target variable that corresponds to the input variables $x_1$, $x_2$, $x_3$, ..., $x_k$. For example, the target variable, Y, may be a probability of a user incurring an insufficient funds fee during a prediction period and the input variables, $X_1$, $x_2$, $x_3$, ..., $x_k$, may include a minimum account balance, a maximum account balance, a turnover trend, etc. Other arrangements and formats are possible.

Trainer 160 uses the data subsets 162 and 164 to train predictive model 150. Each training example may include historical financial data for a given week and an indication of whether a corresponding user incurred an insufficient funds fee during that week or in the subsequent week.

Once trained, the predictive model 150 may use new financial data related to a user to determine a probability of that user incurring an insufficient funds fee. The probability of a user incurring an insufficient funds fee may be output from the model as prediction 170. That is, the prediction 170 provides an indication of the likelihood that the user will incur an insufficient funds fee within the prediction period.

System 100 also includes a notification engine 180. Based on the prediction 170, the notification engine 180 may generate an alert to be displayed to the user associated with the new financial data. For example, the notification engine 180 may determine if a prediction satisfies a threshold. In some instances, the threshold indicates a minimum probability that an insufficient funds fee will occur. If the prediction 170 satisfies the threshold, the notification engine 180 generates an alert that notifies the user that an insufficient funds is likely to occur in a prediction period (e.g., in the next few days, in the next week, etc.). The alert may include a recommended action the user can take to avoid the insufficient funds fee. In some embodiments, the alert may suggest that the user transfer funds from a different account to the account with insufficient funds. In other embodiments, the alert may suggest that the user pay a particular bill with a credit card rather than writing a check.

If the prediction 170 does not satisfy the threshold, the notification engine 180 may nevertheless generate a notification that indicates that the user should maintain a current financial position to avoid future insufficient funds fees. For example, the alert may indicate to the user that there is a low chance of incurring an insufficient funds fee and that the user should continue managing their finances as the user has done in the past.

In some examples, the notification engine 180 may determine if the prediction 170 satisfies more than one threshold. For example, the notification engine may determine whether the prediction 170 falls within a particular range (based on an upper bound and a lower bound set by the thresholds). If the prediction 170 for a given user falls within a particular range, the notification engine 180 may generate a specific notification to be sent to that user. For example, the threshold to generate an alert may be 90% or greater that an insufficient funds fee will occur. However, if the prediction 170 satisfies a second threshold of 85%, the notification engine may generate a different alert that provides a warning to the user, rather than suggestions to avoid an insufficient funds fee.

The notification engine 180 may also identify a risk level (e.g., high risk, medium risk, low risk, etc.) for incurring an insufficient funds fee based on the prediction 170. Based on the risk level, the notification engine 180 may generate a weekly report for users that fall within a particular risk level. For example, the notification engine 180 may generate a report to be sent to each user at regular intervals (e.g., daily, weekly, biweekly, etc.). The notification engine 180 may generate a report for users that have a high risk (e.g., a probability over 90%) of incurring an insufficient funds fee during the prediction period. The report may include suggested actions for the user to take in order to avoid the insufficient funds fee. The notification engine 180 may also track the risk level of a particular user over time and provide a historical visualization of the risk level of that user in the report.

A different report may be generated for users with a medium risk of incurring an insufficient funds fee. For example, the report for users with a medium risk may provide suggestions for a user to manage their finances over a period longer than the prediction period (e.g., one or more months, years, etc.). The suggestions may include a recommended financial management application that the user can install on various electronic devices of the user (e.g., a smartphone, tablet, laptop, desktop computer, etc.). The financial management application may provide additional functionality to avoid incurring an insufficient funds fee.

Figure 2:
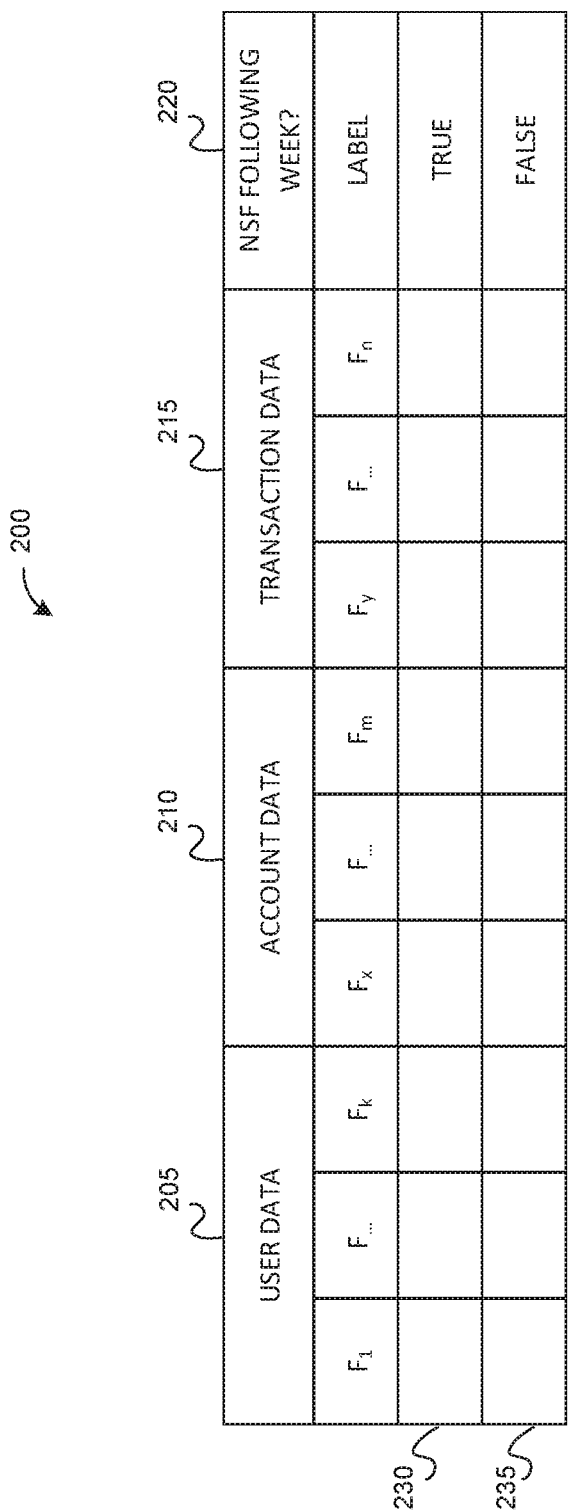
FIG. 2 depicts an example format for training data used to train a predictive model.

FIG. 2 depicts an example format for training data 200 used to train a predictive model. As shown, the training data includes user data 205, account data 210, and transaction data 215. As discussed above, for each user in the plurality of users, historical financial data may be separated by week. Each week of historical financial data for a given user may be included as a row in training data 200. For example, row 230 may correspond to a first week of historical financial data for the user and row 235 may correspond to a second week of historical financial data for the user. While only two rows (230 and 235) are shown in FIG. 2, the training data may include many rows for each user in the plurality of users. For example, if the training data is limited to six months, the training data 200 may include about 26 rows (one for each week) for each user in the plurality of users. Although not shown, each row of training data may include an identifier of the corresponding user and an indication of a corresponding week.

As shown in column 220, each row (including rows 230 and 235) of training data may indicate whether a user incurred at least one insufficient funds fee during a particular week based on the data for that week. That is, whether a user incurred an insufficient funds fee during the particular week (as indicated in column 220) is determined based on the data variables (e.g., user data 205, account data 210, transaction data 215, and data derived therefrom) for the preceding week. As shown, the indication of whether a user incurred an insufficient funds fee during a preceding week as shown in column 220 is "TRUE" or "FALSE." However, the data indicating whether an insufficient funds fee occurred may take many other forms (e.g., '1' or '0').

Figure 3:
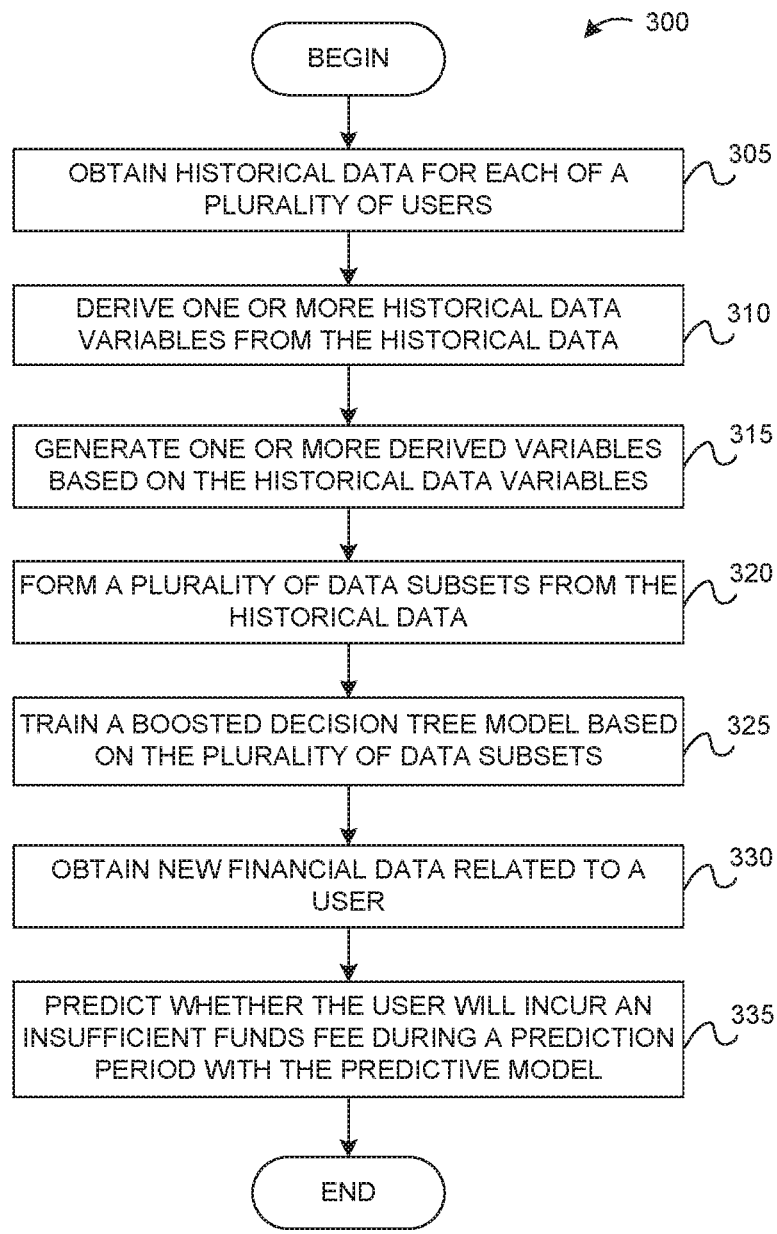
FIG. 3 depicts a method for predicting whether a user will incur an insufficient funds fee.

FIG. 3 depicts a method 300 for predicting whether a user will incur an insufficient funds fee during a prediction period.

The method 300 begins at step 305 with obtaining historical data for each of a plurality of users. For example, the historical data may include user data, account data, and transaction data as described above with respect to FIGS. 1 and 2.

The method 300 proceeds to step 310 where one or more historical data variables are derived from the historical data. For example, a balance of funds in an account of a user at a particular time, a number of times a user logged into a financial management application, an amount related to one or more transactions conducted by the user during a backward-looking period, and others may be derived, as described with respect to FIG. 1. The process of deriving the historical data variables from the historical data may include filtering, transforming, normalizing, or otherwise processing the data to be used with the predictive model.

The method 300 proceeds to step 315, where one or more derived variables are generated based on the historical data variables. For example, an average number of insufficient funds fees, an average account balance, a turnover, a turnover trend, and others may be derived based on the historical data variables, as described with respect to FIG. 1. In some cases, the derived data variables may take a different form than the data from which they are derived. For example, a categorical derived variable may be derived from numerical historical data.

The method 300 proceeds to step 320, where a plurality of data subsets are formed. For example, data subsets such as data subset 162 and 164 in FIG. 1 may be formed. Each data subset in the plurality of data subsets may comprise a different set of data than any other data subset in the plurality of data subsets. Generally, not all of the historical data and derived data will be included in the data subsets. The historical data and derived data not included in the data subsets may be used for testing the resulting predictive model.

The method 300 proceeds to step 325, where a boosted decision tree model is trained based on the plurality of data subsets. For example, a boosted decision tree model may be formed using a gradient boosting technique as discussed with respect to FIG. 1. The boosted decision tree model may be a combination of multiple "weak" predictive models. The boosted decision tree model may use the historical data variables as training examples for predicting whether an insufficient funds fee will occur based on new financial data received.

The method 300 proceeds to step 330, where new financial data related to a user is obtained. Like the historical data, the new financial data may include user data, account data, and transaction data. The new financial data may be gathered by an organization and stored by that organization. The new financial data may also be received from one or more third parties. New financial data received from one or more third parties may be aggregated by a financial management software.

The method proceeds to step 335, where the boosted decision tree model predicts whether the user will incur an insufficient funds fee during a prediction period based on the new financial data. In some implementations, the result of the prediction may be a numerical value between '0' and '1' representing a probability of the user incurring an insufficient funds fee during the prediction period. For example, a result of 0.6 may indicate that there is a 60% chance that the user will incur an insufficient funds fee.

Figure 4:
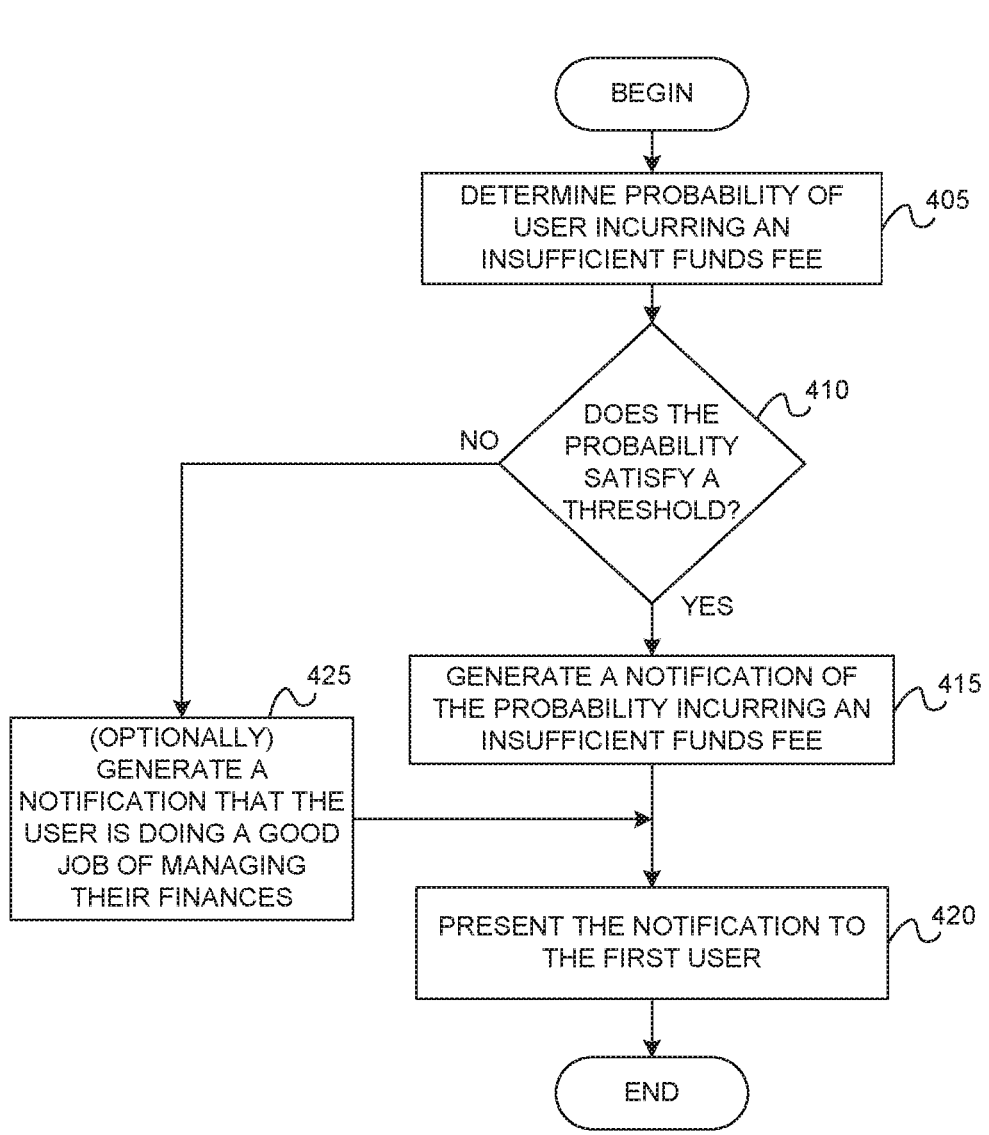
FIG. 4 depicts a method for generating a notification for a user based on a likelihood of the user incurring an insufficient funds fee.

FIG. 4 depicts a method 400 for generating a notification for a user based on a probability of the user incurring an insufficient funds fee.

The method 400 begins at step 405 where a probability of a user incurring an insufficient funds fee is determined. For example, the probability may be determined using method 300 as shown in FIG. 3.

The method 400 proceeds to step 410, where a notification engine (e.g., notification engine 180 in FIG. 1) determines whether the probability satisfies a threshold. As discussed above, the notification engine may determine is the probability satisfies more than one threshold (e.g., the probability is within a particular range). If the probability does satisfy the threshold (e.g., it is greater than the threshold), the notification engine generates a notification to alert the user of the probability that the user will incur an insufficient funds fee at step 415. The notification at step 415 may also include a suggested action to be taken by the user to avoid the insufficient funds fee. For example, if the user will receive a paycheck at the end of a current week, the notification may suggest that the user refrain from making a purchase at a particular merchant until a subsequent week. In this way, the notification may help the user to avoid incurring an insufficient funds fee.

If the probability does not satisfy the threshold at step 410 (e.g., the probability is less than the threshold), the notification engine may generate a notification indicating that the user is doing a good job of managing their finances at step 425. For example, the notification engine may generate a notification at step 425 that informs the user that an insufficient funds fee is not likely to occur during the prediction period. The notification at step 425 may also suggest that the user continue managing their finances as they have in the past.

At step 420, the notification is presented to the user. For example, the notification may be displayed on a screen of an electronic device associated with the user. The notification may be displayed as a native notification (e.g., a notification of the operating system of the electronic device) or as a notification within a specific application (e.g., a financial management application executing on the electronic device). The notification may also be displayed to the user in a web-based application. In some examples, the notification is not presented to the user immediately. Rather, the notification may be presented to the user (either natively or in a web-based application) upon initializing a specific application or upon the user logging into a user account.

Figure 5:
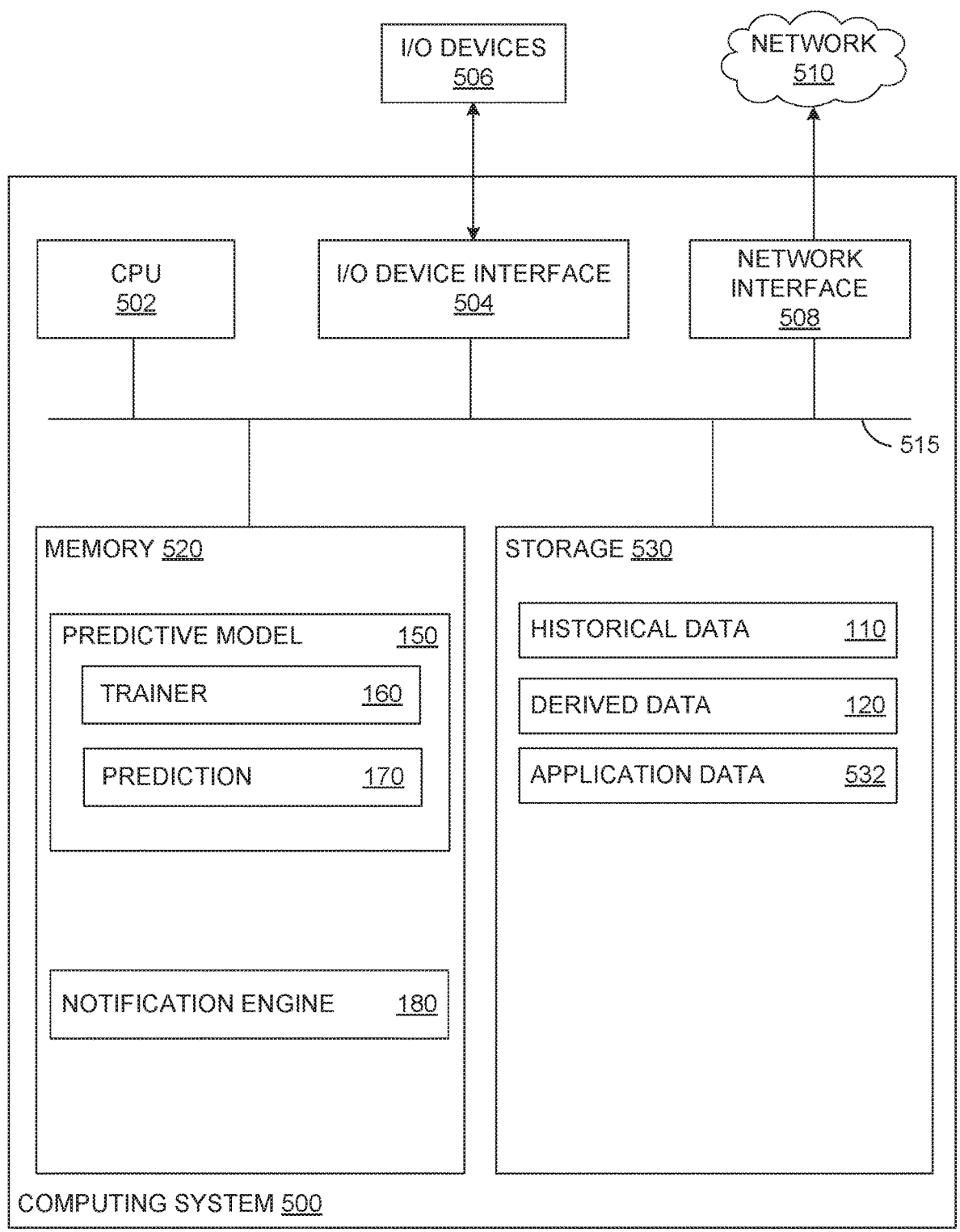
FIG. 5 depicts an example computing system for implementing a method for predicting whether a user will incur an insufficient funds fee.

FIG. 5 depicts an example computing system 500 for implementing a method for predicting whether a user will incur an insufficient funds fee during a prediction period.

As shown, the computing system 500 includes a central processing unit (CPU) 502 for executing programming instructions; one or more input/output (I/O) device interfaces 504, which may allow for connection of various I/O devices 506 (e.g., keyboards, displays, mouse devices, pen inputs, etc.); network interface 508, which may include, for example, a transceiver for transmitting and receiving data from an external network, such as network 510; a memory 520, such as a volatile random access memory; a storage 530, such as a non-volatile disk drive, RAID array, etc.; and an interconnect 515, such as a data bus. In some examples, some or all of storage 530 may be remote from the computing system 500 (not shown) and may instead be accessed via network interface 508.

CPU 502 may retrieve and execute executable instructions stored in memory 520 via interconnect 515. In this example, memory 520 includes program code for implementing a predictive model 150, including a trainer 160, such as described with respect to FIG. 1. Memory 520 may further include program code for implementing a notification engine 180, such as described with respect to FIG. 1.

CPU 502 may also retrieve and process data from storage 530. In this example, storage 530 includes data, such as historical data 110 and derived data 120, such as described with respect to FIG. 1, and application data 532. Application data 532 may include program code for a financial management application.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system comprising:
a processor; and
a memory comprising executable instructions, which, when executed by the processor, cause the system to:
train a plurality of predictive models using training data from a plurality of backward-looking periods to generate predictions for a given forward-looking period;
determine accuracies of the plurality of predictive models using testing data by comparing outputs from the plurality of predictive models to labels in the testing data indicating whether insufficient fund fees were historically incurred;
select a backward-looking period of the plurality of backward-looking periods that is most accurate for the given forward-looking period based on which accuracy of the accuracies is highest;
obtain historical data corresponding to the selected backward looking period and related to a financial history of each of a plurality of users;
determine one or more historical data variables from the historical data;
generate one or more derived variables from the historical data;
form a plurality of data subsets from the historical data based on the one or more historical data variables and the one or more derived variables, each data subset of the plurality of data subsets comprising a different set of data than any other data subset in the plurality of data subsets;
train a boosted decision tree model based on the plurality of data subsets;
obtain new financial data related to a user;
predict a probability of the user incurring an insufficient funds fee during the given forward-looking period with the boosted decision tree model;
determine, based on the probability, a risk level that the user will incur the insufficient funds fee during the given forward-looking period, wherein the risk level is selected from a plurality of risk levels comprising:
a low risk level that is associated with a first probability range;
a medium risk level that is associated with a second probability range; and
a high risk level that is associated with a third probability range; and
determine a notification to provide to the user based on the risk level.

2. The system of claim 1, the memory further comprising executable instructions, which, when executed by the processor, cause the system to present the notification to the user to alert the user of the probability of incurring the insufficient funds fee.

3. The system of claim 2, wherein the notification comprises a suggested action for the user to avoid the insufficient funds fee.

4. The system of claim 1, the memory further comprising executable instructions, which, when executed by the processor, cause the system to:
generate a report of the risk level that the user will incur the insufficient funds fee, the report including a historical visualization of the risk level of the user; and
present the report to the user.

5. The system of claim 1, the memory further comprising executable instructions, which, when executed by the processor, cause the system to:
generate a plurality of decision tree-based models based on the plurality of data subsets using a gradient boosting technique; and
generate the boosted decision tree model based on the plurality of decision tree-based models.

6. The system of claim 1, wherein the plurality of users comprises only users that have incurred an insufficient funds fee during the backward-looking period.

7. A non-transitory computer-readable storage medium storing instructions, which, when executed on a processor, performs an operation for an insufficient funds fee, the operation comprising:
training a plurality of predictive models using training data from a plurality of backward-looking periods to generate predictions for a given forward-looking period;
determining accuracies of the plurality of predictive models using testing data by comparing outputs from the plurality of predictive models to labels in the testing data indicating whether insufficient fund fees were historically incurred;
selecting a backward-looking period of the plurality of backward-looking periods that is most accurate for the given forward-looking period based on which accuracy of the accuracies is highest;
obtaining historical data corresponding to the selected backward looking period and related to a financial history of each of a plurality of users;
determining one or more historical data variables from the historical data;
generating one or more derived variables from the historical data;

forming a plurality of data subsets from the historical data based on the one or more historical data variables and the one or more derived variables, each data subset of the plurality of data subsets comprising a different set of data than any other data subset in the plurality of data subsets;

training a boosted decision tree model based on the plurality of data subsets;

obtaining new financial data related to a user;

predicting a probability of the user incurring an insufficient funds fee during the given forward-looking period with the boosted decision tree model;

determining, based on the probability, a risk level that the user will incur the insufficient funds fee during the given forward-looking period, wherein the risk level is selected from a plurality of risk levels comprising:
a low risk level that is associated with a first probability range;
a medium risk level that is associated with a second probability range; and
a high risk level that is associated with a third probability range; and determining a notification to provide to the user based on the risk level.

8. The non-transitory computer-readable storage medium of claim 7, the operation further comprising: presenting the notification to the user to alert the user of the probability of incurring the insufficient funds fee.

9. The non-transitory computer-readable storage medium of claim 8, wherein the notification comprises a suggested action for the user to avoid the insufficient funds fee.

10. The non-transitory computer-readable storage medium of claim 7, the operation further comprising:
generating a report of the risk level that the user will incur the insufficient funds fee, the report including a historical visualization of the risk level of the user; and
presenting the report to the user.

11. The non-transitory computer-readable storage medium of claim 7, the operation further comprising:
generating a plurality of decision tree-based models based on the plurality of data subsets using a gradient boosting technique; and
generating the boosted decision tree model based on the plurality of decision tree-based models.

12. The non-transitory computer-readable storage medium of claim 7, wherein the plurality of users comprises only users that have incurred an insufficient funds fee during the backward-looking period.

13. The non-transitory computer-readable storage medium of claim 7, wherein each data subset in the plurality of data subsets comprises respective historical data related to one or more respective users of the plurality of users.

14. A method for predicting an insufficient funds fee, the method comprising:
training a plurality of predictive models using training data from a plurality of backward-looking periods to generate predictions for a given forward-looking period;
determining accuracies of the plurality of predictive models using testing data by comparing outputs from the plurality of predictive models to labels in the testing data indicating whether insufficient fund fees were historically incurred;
selecting a backward-looking period of the plurality of backward-looking periods that is most accurate for the given forward-looking period based on which accuracy of the accuracies is highest;
obtaining historical data corresponding to the selected backward looking period related to a financial history of each of a plurality of users;
determining one or more historical data variables from the historical data;
generating one or more derived variables from the historical data;
forming a plurality of data subsets from the historical data based on the one or more historical data variables and the one or more derived variables, each data subset of the plurality of data subsets comprising a different set of data than any other data subset in the plurality of data subsets;
training a boosted decision tree model based on the plurality of data subsets;
obtaining new financial data related to a user;
predicting a probability of the user incurring an insufficient funds fee during the given forward-looking period with the boosted decision tree model;
determining, based on the probability, a risk level that the user will incur the insufficient funds fee during the given forward-looking period, wherein the risk level is selected from a plurality of risk levels comprising:
a low risk level that is associated with a first probability range;
a medium risk level that is associated with a second probability range; and
a high risk level that is associated with a third probability range; and
determining a notification to provide to the user based on the risk level.

15. The method of claim 14, further comprising: presenting the notification to the user to alert the user of the probability of incurring the insufficient funds fee.

16. The method of claim 15, wherein the notification comprises a suggested action for the user to avoid the insufficient funds fee.

17. The method of claim 14, further comprising:
generating a report of the risk level of the user that the user will incur the insufficient funds fee, the report including a historical visualization of the risk level of the user; and
presenting the report to the user.

18. The method of claim 14, further comprising:
generating a plurality of decision tree-based models based on the plurality of data subsets using a gradient boosting technique; and
generating the boosted decision tree model based on the plurality of decision tree-based models.

19. The method of claim 14, wherein the plurality of users comprises only users that have incurred an insufficient funds fee during the backward-looking period.

20. The method of claim 14, wherein each data subset in the plurality of data subsets comprises respective historical data related to one or more respective users of the plurality of users.

* * * * *